United States Patent [19]

Ogihara et al.

[11] Patent Number: 5,375,531
[45] Date of Patent: Dec. 27, 1994

[54] COMPOSITE SUPERCONDUCTOR BODY AND MAGNETIC LEVITATION SYSTEM

[75] Inventors: Masahiro Ogihara, Amagasaki; Katsuzo Aihara, Hitachioota, both of Japan

[73] Assignee: Hitachi, Ltd., Tokyo, Japan

[21] Appl. No.: 173,486

[22] Filed: Dec. 27, 1993

Related U.S. Application Data

[63] Continuation of Ser. No. 905,746, Jun. 29, 1992, abandoned.

[30] Foreign Application Priority Data

Jun. 28, 1991 [JP] Japan .................. 3-158059

[51] Int. Cl.⁵ .............................. B60L 13/00
[52] U.S. Cl. .................. 104/281; 104/285; 104/286
[58] Field of Search .......... 104/282, 281, 283, 285, 104/286; 505/1, 700, 785, 902, 903, 904, 905; 188/267, 164

[56] References Cited

U.S. PATENT DOCUMENTS

| | | | |
|---|---|---|---|
| 3,858,521 | 1/1975 | Atherton | 104/148 |
| 3,861,320 | 1/1975 | Lichtenberg | 104/130 |
| 3,904,898 | 9/1975 | Mailfert | 310/12 |
| 4,868,431 | 9/1989 | Karita et al. | 310/12 |
| 4,879,537 | 11/1989 | Marshall et al. | 335/216 |
| 4,885,273 | 12/1989 | Sugimoto et al. | 505/1 |
| 4,979,445 | 12/1990 | Lanzara | 104/281 |
| 5,015,622 | 5/1991 | Ward et al. | 505/1 |
| 5,041,416 | 8/1991 | Wilson | 505/785 |

FOREIGN PATENT DOCUMENTS

| | | |
|---|---|---|
| 2053093 | 4/1971 | France . |
| 0170205 | 7/1986 | Japan ................. 104/285 |
| 0210806 | 9/1987 | Japan ................. 104/285 |
| 0249403 | 10/1988 | Japan ................. 104/281 |
| 0287305 | 11/1988 | Japan ................. 104/285 |
| 0026308 | 1/1989 | Japan ................. 104/281 |
| 0047202 | 2/1989 | Japan ................. 104/281 |
| 0186104 | 7/1989 | Japan ................. 104/281 |
| 206804 | 8/1989 | Japan . |
| 248977 | 10/1989 | Japan . |
| 248979 | 10/1989 | Japan . |
| 188171 | 7/1990 | Japan . |
| 250305 | 10/1990 | Japan . |

OTHER PUBLICATIONS

The Nikkan Kogyo Shimbun was issued on Nov. 25, 1987.
The Yomiuri Shimbun was issued on Mar. 28, 1989.
Lecture Journal of 12th Meeting of Japanese Applied Magnetics Society, Sep. 30, 1988.

(List continued on next page.)

*Primary Examiner*—Mark T. Le
*Attorney, Agent, or Firm*—Antonelli, Terry, Stout & Kraus

[57] ABSTRACT

A superconductor composite body have a plurality of superconductor elements. Each of superconductor elements has such a volume that the superconductor element is not magnetically saturated with a magnetic flux applied to the composite body. The superconductor elements are assembled in one plane into one body in a such manner that superconductor elements are electrically coupled with each other when the superconductor elements are united with the electrically conductive non-magnetic material. The superconductor elements can be simply secured or fixed to a substrate with an adhesive or other suitable manners. When the superconductor elements have a thickness 1 mm or more, a sufficient levitation force can be generated provided that a condition of the lateral area of the assembled elements which are determined by a magnetic field and a critical current density is satisfied.

24 Claims, 5 Drawing Sheets

OTHER PUBLICATIONS

Lecture Journal of Autumn Low Temperature Engineering, 1988.
Lecture Journal of Spring Low Temperature Engineering, 1990.
IBM Technical Disclosure Bulletin, vol. 31, No. 9, Feb. 1989, pp. 255–257, "Superconducting Tooth Structures for Electromagnetic Devices".
IEEE Transactions on Vehicular Technology, vol. VT-29, No. 1, Feb. 1980, pp. 41–49, "Combined Magnetic Levitation and Propulsion: The Mag-Transit Concept", Rule et al.
Patent Abstracts of Japan, vol. 015, No. 183 JP-A-03043971 published Feb. 25, 1991.
Patent Abstracts of Japan, vol. 13, No. 548 JP-A-01227672, published Sep. 11, 1989.
Patent Abstracts of Japan, vol. 14, No. 15 JP-A-01260676, published Oct. 17, 1989.
Patent Abstracts of Japan, vol. 14, No. 576 JP-A-02250305, published Oct. 8, 1990.
Patent Abstracts of Japan, vol. 15, No. 379 JP-A-03150806, published Jun. 27, 1991.
Patent Abstracts of Japan, vol. 13, No. 354 JP-A-01114382, published May 8, 1989.
Patent Abstracts of Japan, vol. 13, No. 534 JP-A-01218370, published Feb. 25, 1988.
Derwent, Database WPIL AN:89-329429 (no date).

Running direction

COMPOSITE SUPERCONDUCTOR BODY AND MAGNETIC LEVITATION SYSTEM

This application is a continuation of application Ser. No. 07/905,746, filed on Jun. 29, 1992 now abandoned.

BACKGROUND OF THE INVENTION

1. Field of the Invention

The present invention relates to a composite superconductive body, for use in diamagnetic levitation systems, and a superconduction magnetic levitation system for levitating and driving a superconductive levitation body. The present invention may be applied for example to a carrier system for articles.

2. Description of the Prior Art

Rapid and dust-free carrying are available in a non-contact carrier because no friction is caused at a running surface. A magnetic levitation type linear motor is one example of a non-contact carriers. A magnetic repulsion type magnetic levitation train, which is known, has been developed with a principal object of high speed transport of passengers, and uses superconductive magnets because a high magnetic field is requested so as to support the weight of the train and passengers.

In a hospital or semiconductor factory where dust-free transport is required, a magnetic repulsion type or magnetic attraction type magnetic levitation linear motor is used. In dust-free transport where carrying of heavy articles is not required, normal conductive magnets are used. As mentioned above, various magnetic levitation linear motors are available depending on application. In every motor, however, magnetic field control for supporting levitation is difficult and the carrier is expensive.

Following the discovery of high temperature superconductors, i.e. superconductors having a critical temperature higher than the temperature of liquid nitrogen (77K), magnetic levitation using the diamagnetism of a superconductor has attracted attention. Magnetic levitation and driving using the diamagnetism can be realized by a comparatively simple structure of a combination of magnets and superconductors and complicated magnetic field control for supporting levitation is not required.

In the magnetic levitation train mentioned above using superconductive magnets, a large current flows through the train because the electric resistance of a superconductor is zero and a high magnetic field is generated on the side of the body of the train, and hence the magnetic effect on the passenger space comes into question.

By making an induced current flow in each levitation coil installed on the ground, magnetic repulsion force is generated between the levitation coil and the superconductive magnet of the body so as to obtain levitation force. Therefore, when the train is stopped, the magnetic field in the levitation coil does not change, no induced current flows, and the levitation force is zero.

In the case of low speed running, the magnetic field changes little and sufficient levitation force also cannot be obtained. Therefore, when the train is stopped or runs at a low speed, the body is supported by the wheels, and it is impossible that the body is always kept levitated.

In the case of a magnetic levitation train using the diamagnetism instead of the magnetic levitation train described above, the levitation force is obtained even when the train is stopped and the magnetic repulsion force arises by shielding the magnetism. This is known as the Meissner effect.

Therefore, by using superconductors on the levitation body, the magnetic effect in the train of the magnets on the ground can be reduced. By magnetic levitation and driving using diamagnetism, inexpensive and dust-free non-contact carrying with sophisticated performance can be realized, unlike a carrier using a conventional magnetic levitation linear motor.

Previously proposed diamagnetism type magnetic levitation devices using high temperature superconductors will now be described.

(1) In Nikkan Kogyo Shimbun issued on Nov. 25, 1987, it is described that high temperature superconductors are installed along a slope so as to form a track and levitated magnets run on the sloping track using the gravity as a driving source.

(2) As described in Yomiuri Shimbun issued on Mar. 28, 1989, the high temperature superconductors and magnets of (1) above are reversely arranged and the superconductors are used as a levitation body. As driving force, gravity is used by means of a slope in the same way as in (1).

(3) As described in Lecture Journal of 12th Meeting of Japanese Applied Magnetics Society, Sep. 30, 1988, p. 18, superconductors levitated on magnets move horizontally by following magnets on the ground which are moved mechanically.

(4) It is described in Lecture Journal of Autumn Low Temperature Engineering, 1988, p. 137, that magnets levitated by split stripe-shaped superconductors on the ground are moved horizontally by controlling the superconducting status of each superconductor. The transition between superconductivity and normal conductivity is used as driving force.

(5) In the method proposed in Japanese Patent Application Laid-Open No. 2-250305 (Application No. 1-70634), a track having a uniform magnetic field in the running direction is constructed by levitation magnets and superconductors levitated on the track are moved horizontally using the changing magnetic field of driving magnets as a magnetic field slope.

(6) An unpublished proposal with supplements (5), relates to an induction type linear motor whereon the arrangement of levitation magnets for obtaining lateral guidance force during running and the most suitable shape and arrangement of driving coils are specified (Japanese Patent Application No. 2-288536 and corresponding U.S.A. and European patent applications, none of them yet published).

(7) A synchronizing linear motor for moving magnets levitated on a track constructed by high temperature superconductors by exciting coils on the ground by a three phase alternating current is described in Lecture Journal of Spring Low Temperature Engineering, 1990, p. 110.

In the above prior proposals, the driving force in (1) and (2) is derived from the slope and the control of driving is not taken into consideration. In (3), magnets are required to be moved mechanically and a mechanically sliding section exists. Therefore, this is not suited to non-contact carrying which aims at clean carrying.

In (4), the running speed of the levitation body is affected by the transition speed between superconductivity and normal conductivity and the control is very difficult. Furthermore, there is a problem that a high driving force cannot be obtained.

In (5), since a magnetic field slope is used as a driving source, there are problems arising that a high driving force cannot easily be obtained and the driving efficiency and the controllability are not so good. Furthermore, the lateral guidance force during running is not taken into sufficient consideration. In the above proposals therefore, there is a problem that the controllability for a levitation train or carrier is not sufficient.

In (6), to complement (5), the controllability is enhanced by increasing the guidance force during running by providing a magnetic field distribution so that the field is uniform in the running direction and a magnetic field wall is obtained in the lateral direction and by optimizing the driving coils.

However, enlargement of the levitation body or superconductors in scale-up of the device is not taken into special consideration. Since high temperature superconductors which can be used by liquid nitrogen temperature have ceramic fragility, they are lacking in workability. Enlargement by mechanical connection is difficult. Manufacture of large-scale integrated superconductors is difficult due to occurrence of cracks or restrictions of the manufacturing process.

In (7), small pieces of high temperature superconductors are laid on the ground for scale-up of the track. However, the superconductor status of the scaled-up track is required to be maintained and a large scale cooling device is required. In this device, the levitation body (magnet) has magnetic poles and the magnetic poles move in synchronization with the proceeding magnetic field generated by exciting the driving coils by a three phase alternating current.

In such a synchronizing linear motor, the accuracy of the pitch between driving coils is important. Assuming that the magnet length in the running direction is L and the pitch is p, the following equation is required to hold:

$$p = (\tfrac{2}{3})L$$

When the equation does not hold, the attraction and repulsion between the driving coils are unbalanced and the levitation body moves (vibrates) up and down. In an extreme case, the levitation body comes in contact with the track on the ground. When scaling up the track and subjecting the driving coils to split excitation so as to control the section, the phase of supply current is required to be fixed for section switching.

Since only the restraint between superconductors and magnets is used as guidance force during running, sufficient guidance force cannot be obtained. When superconductors which generate strong restraint or strong flux trapping force are used, the guidance force increases, though it acts as braking force for driving, which is a disadvantage to the device.

For the above reason, the inductive linear motor of (6) is in principle suitable for a levitation device using the diamagnetism of superconductors.

SUMMARY OF THE INVENTION

A first object of the present invention is to increase the driving force of a levitation body, using an inductive linear motor such as that of document (6) above, thereby permitting scale-up or enlargement of the system.

The second object of the present invention is to provide, in some embodiment, an improved leviation force.

Superconductors lose superconductivity at above their critical temperature and cannot levitate. The third object of the present invention is to provide, in some embodiment, more efficient cooling.

The fourth object of the present invention is to provide, in some embodiment, improved lateral guidance force during running.

In document (6) above, since the track generates a uniform magnetic field in the running direction due to the arrangement of magnets, the train can run sufficiently only by its inertial force, but only the air resistance is available as braking force. A fifth object of the present invention is to provide, in some embodiments, sufficient braking force and to a method of holding the stop state.

In a first aspect, the present invention provides a superconductor composite body having a plurality of superconductor elements each of which has such a volume that the superconductor element is not magnetically saturated with a magnetic flux applied to the composite body. If the volume of the element is too small, the elements are easily saturated with magnetic flux which penetrates into the volume.

The relation between the volume of a single superconductor element and the strength of the magnetic flux is represented as follows.

$$D \geq 5B/\pi J_c$$

wherein D is a diameter (cm) of a columnar superconductor element, B a magnetic field (gauss), which is applied to the element in parallel with a longitudinal direction of the column and $J_c$ a critical current density (A/cm$^2$) of the superconductor material used.

In the above equation, the length of the column is presumed three times the diameter for neglecting the influence of the demagnetization problem. However, a superconductor element can generate a sufficient levitation force if it has a thickness of 1 mm or more. Therefore, in the specification, discussion is made under a premise that the thickness of the superconductor elements is 1 mm or more. In the above equation, when B is 50 gauss and $J_c$ is 500 A/cm$^2$, D should be 1.6 mm or more.

When a strength of the magnetic field is about 5000 gauss or less, preferably 100 to 500 gauss and a critical current of a superconductor material at 77K under the magnetic field 10 A/cm$^2$ or more, the superconductor elements should be have a cross sectional dimension of 1 mm or more. It is not required that all of the superconductor elements in the composite body must have the above mentioned dimension or larger than that dimension.

That is, superconductor Grains or particles having a dimension smaller than the above mentioned dimension may be present in the composite body. The sufficiently large superconductor elements should be 50 volume % of the total superconductor material in the composite body.

The superconductor elements are assembled in one plane into one body in a such manner that superconductor elements are electrically coupled with each other when the elements are united with the electrically conductive non-magnetic material. But, this is not the essential point of the present invention. The elements can be simply secured or fixed to a substrate with an adhesive or other suitable manners.

In the present invention, the superconductor elements must be plural. The present invention resides in that since it is difficult to make a "sound (high quality)"

superconductor bulk body of a large volume which generates a sufficient levitation force, smaller superconductor elements are assembled in one plane or in one lateral plane in magnetic coupling relation to form a single superconductor body having a sufficiently large volume.

If superconductor elements have a thickness 1 mm or more, a sufficient levitation force can be generated provided that a condition of the lateral area of the assembled elements which are determined by a magnetic field and a critical current density is satisfied. If the thickness of elements is less than 1 mm, the thickness can be increased by laminating the elements in thickness direction.

An electrically conductive non-magnetic material unites with the superconductor elements to form an integral composite body.

Materials for the electrically conductive non-magnetic material should preferably have a specific resistance of $10^{-2}$ to $10^{-7}$ ohm.cm at 77K. If the specific resistance is larger than $10^{-2}$ ohm.cm, an amount of induced current due to magnetic induction becomes too small so that a propulsion force becomes too small. On the other hand, if the specific resistance is too small, a sufficient starting driving force will not be obtained.

Preferably the superconductor elements and the non-magnetic material are electrically connected, but particularly in the case where the superconductor elements are large, electrical connection is not necessary, and mechanical connection with or without electrical connection is sufficient.

The present invention also provides a magnetic levitation body suitable for diamagnetic levitation having superconductive elements made of high temperature superconductive material and an electrically conductive non-magnetic material unites with said superconductive material to form an integral composite body, in which said superconductor elements and said non-magnetic material are preferably electrically connected. The superconductor elements are preferably ones having a cross-sectional dimension of at least 1 mm.

In the levitation body, the superconductor elements may be embedded in the non-magnetic material or mechanically attached to it, e.g. by bonding. In the case of mechanically attachment, the superconductor elements preferably overlap the non-magnetic material partly or entirely as seen in plan view.

The present invention further provides a superconductor composite body for diamagnetic levitation comprising a cast matrix of metal and a plurality of elements of high temperature superconductive material spaced apart in the matrix, the superconductive material being of higher melting point than said metal.

In this concept of the present invention, the aim is to improve the linear driving force obtained by improving the interaction of the levitation body with the driving coils. The composite superconductor body of the present invention has reduced electrical resistance to eddy currents, as described below, so that the resulting driving force is increased.

By a high temperature superconductive material there is meant one which has a critical temperature higher than 77K.

Superconductor elements having a cross-sectional dimension of at least 1 mm are, as mentioned, preferred in the levitation body. By cross-sectional dimension is meant the diameter in the case of an element of circular transverse cross-section, and in the case of an element not having a circular transverse cross-section, the cross-sectional dimension is the average of two smallest mutually perpendicular dimensions of the element, e.g. the average of the width and thickness of a ribbon-shaped element.

As appropriate dimensions of the composite levitation body, for use as a carrier, the body preferably has a shape such that at least two mutually perpendicular dimensions are both at least 10 mm. Conventional superconductor wires are of small dimensions.

The volume content of the superconductor elements in the body is preferably in the range 10–99%, more preferably at least 60% and most preferably at least 75%.

Preferably there are at least two superconductor elements in the composite body, rigidly joined by the non-magnetic material. Large numbers of small superconductor elements may be distributed in the body, or a number, e.g. 10 or more, of larger elements, e.g. of 5 mm, minimum cross-sectional dimension may be arranged spaced apart, e.g. embedded in or laminated to the non-magnetic material. When two or more types of high temperature superconductors with different magnetic hysteresis are used together in the composite levitation body, the composite superconductors whose magnetic characteristics can be easily adjusted can be obtained.

When such composite superconductor bodies are used, the performance and controllability of a superconduction magnetic system using magnets can be greatly improved. High temperature superconductors with a high magnetic hysteresis (as defined below) may be used as a levitation body or as part of a levitation body. In this case, two or more types of high temperature superconductors with different magnetic hysteresis can be used together. By connecting these superconductors to the non-magnetic conductive materials, a large-scale levitation body with great levitation force can be obtained.

The non-magnetic conductive materials is one having normal (non-superconductive) electrical conductivity. It is desirable that the non-magnetic electrically conductive material used does not react to the superconductive material. Suitable non-magnetic materials are, for example, indium or silver.

Metals with low electric resistivity such as copper, aluminum, or their alloys in addition to the above metals are suitable for the non-magnetic normal conductive metal sheets to which the superconductor elements are fixed. Non-magnetic normal conductive metal boxes can be used effectively in place of sheets, and the metal box may be a one-piece body or a combination of a plurality of metal sheets.

A levitation body comprising high temperature superconductors embedded in the non-magnetic conductive metal and the above metal boxes may be used.

An adiabatic material may be attached to the outside of the metal box, which in use contains a cooling medium for cooling the superconductors. Liquid nitrogen which is inexpensive, inert, and safe is suitable as a cooling medium.

Furthermore, cooling medium feed stations for feeding a cooling medium into the metal box by dropping it naturally may be installed as cooling devices at a plurality of locations along the track. The cooling medium feed stations may be arranged along the track so as to feed a cooling medium continuously or they are arranged discontinuously at specific locations as mentioned above.

To increase the lateral guidance force during running, the present invention provides a magnetic levitation system having:

(a) a diamagnetic levitation body having high temperature superconductor elements, (b) at least one levitation magnet providing a magnetic field effective for diamagnetic levitation of said levitation body, and (c) at least one electromagnetic driving coil for applying a magnetic field effective to cause said levitation body to move when levitated by said levitation magnet, wherein the superconductor elements are made of high temperature superconductor material having magnetic hysteresis whereby interaction of the material with the magnetic field provided by the levitation magnet produces lateral restraint of the levitation body with moving.

High temperature superconductors with a high magnetic hysteresis have great flux pinning force and hence resistance force for lateral magnetic field changes created by the track or guidance force is generated.

In this case, high temperature superconductors with a high magnetic hysteresis may be arranged in the lateral part or parts to provide lateral restraint forces confining the levitation body to the track, and another type of high temperature superconductor may be used in the other part or parts, the high temperature superconductors with a high magnetic hysteresis are used for the whole levitation body.

In another aspect the provides a diamagnetic levitation body having a first superconductor elements, a second superconductor elements arranged laterally of said first superconductor elements relative to travel direction of said levitation body and means for thermally insulating said first and second superconductor elements form each other, whereby said first and second superconductor elements are independently coolable to superconducting temperature.

To obtain braking force during running or for stopping a proceeding magnetic field in the opposite direction can be easily obtained by switching two phases out of the three-phase power line when the driving coils are excited by a three phase alternating current. For a levitation body stopped at a predetermined location, driving coils installed under the front and back ends of the levitation body may be excited by a DC current so that a magnetic field is generated in the direction which is the same as that of the levitation magnet field.

When the driving coils installed under the levitation body are excited by a DC current so that a magnetic field is generated in the direction opposite to that of the levitation magnet application field, it acts as braking force for stopping in the same way. Furthermore, the above excitations may be used simultaneously.

To achieve power conservation and high efficiency of the device, the driving coils may be divided into a plurality of switching sections, sensors for detecting the position of the levitation body during running are installed, and only the driving coil or a group of coils in the section where the levitation body is running are excited.

In sections where running control is not required, no driving coils may be installed and the levitation body runs by its inertia, thus saving the expense of such coils. Power conservation can be achieved by cooling a part of the driving coils or all the coils by air or in another way.

In the track of levitation magnets, a portion with a height difference can be obtained by providing a slope in the running direction. In this case, driving coils of ampere turns greater than that of the driving coils which are installed on a horizontal track section may be installed in the sloping track section so as to maintain the driving force in the sloping section.

Driving coils with a large value of ampere turns may be used in the horizontal section when necessary. For example, the coils for obtaining the braking force for stopping mentioned above and coils which are used for branch switching of a device with a branch track may have a large value of ampere turns.

In a track portion with down and up sloping sections, a cooling medium pool stored in a low location can be used for cooling the coils for cooling the levitation body. Therefore, such cooling medium pools may be installed at several locations of the track as cooling devices for the levitation body.

BRIEF DESCRIPTION OF THE DRAWINGS

Embodiments of the present invention will now be described by way of non-limitative example with reference to the accompanying diagrammatic drawings, in which.

DESCRIPTION OF THE INVENTION

Figure 1:
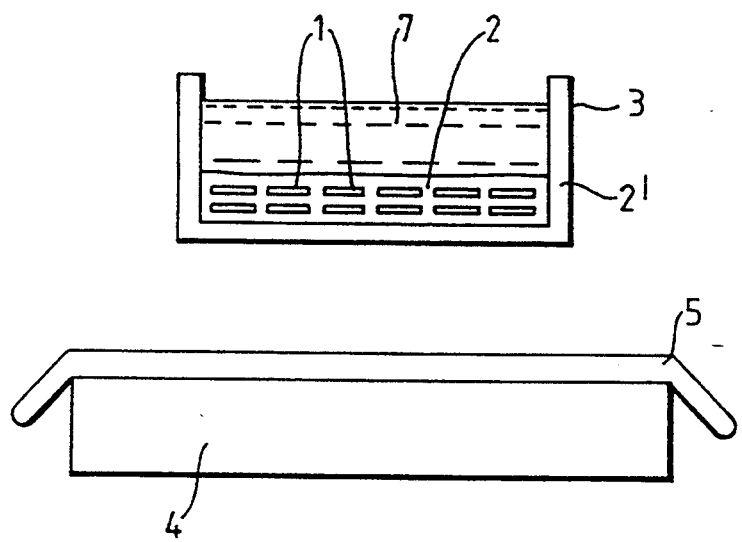
FIG. 1 is a traverse view showing the construction of a levitation body employing the present invention and its positional relation to the levitation track.

In FIGS. 1, 2, 3 and 6, the running direction of the superconductor levitation body is perpendicular to the plane of the paper.

First, the principles behind the present invention will be explained more.

In a levitation device using the diamagnetism, the levitation gap between the superconductor and the magnet is determined by the levitation force F expressed by the following equation.

$$F = \chi V B \partial B / \partial Z$$

where $\chi$ indicates susceptibility of the superconductor, V the volume of the superconductor, B the field strength of the magnet, and $\partial B/\partial Z$ the magnetic field slope.

To increase the levitation force, it is required to increase $\chi$, V, B, and $\partial B/\partial Z$ in the above equation. However, these values cannot be set chosen freely, that is, they are related to each other.

The levitation force increases in proportion to V. However, as V increases, the dead weight of the superconductor also increases and the levitation force per volume does not increase. Unless the levitation force in the above equation is more than the dead weight, the levitation body will not levitate.

The magnetic field B and the magnetic field slope $\partial B/\partial Z$ are values at the levitation location created by the magnets. As the levitation height (levitation gap) increases, these values decrease.

Therefore, to maintain the levitation height and increase the levitation force, it is important to use superconductors with high susceptibility $\chi$.

This $\chi$ which is the diamagnetic susceptibility of superconductors has a maximum quantitative value of $-1$ in the perfect diamagnetic state or Meissner state. When a magnetic field of more than several tens gauss is applied to a bulk specimen of high temperature superconductors, $\chi$ suddenly decreases to 1/100 and the resulting levitation force which results in less than twice of the dead weight.

This is because the grain boundary of high temperature superconductors is a junction with very low superconductivity and the magnetic flux lines easily enter inside on application of a magnetic field.

Recently, yttrium or thallium containing oxide superconductor materials made by the melting method which have strong flux pinning force has been developed. In those materials, the magnetic flux lines are pinned when a magnetic field is applied and hardly enter inside, and hence a high magnetic field current density can be obtained in a magnetic field.

When the magnetization of these materials is measured, it is found that the magnetic hysteresis is high. The susceptibility is the quotient of the magnetization value divided by the field; that is, as the magnetic hysteresis increases in the magnetic field, the susceptibility increases.

In this specification and claims, by the expression "high magnetic hysteresis" we mean a superconductive material has a magnetization hysteresis loop such that, on reversal of the direction of change of an external magnetic field, the magnetization rapidly reverses, and at an applied magnetic field of $\pm.5T$, the magnetic hysteresis loop has a difference in magnetization of at least 10 emu/cms$^3$.

Figure 9:
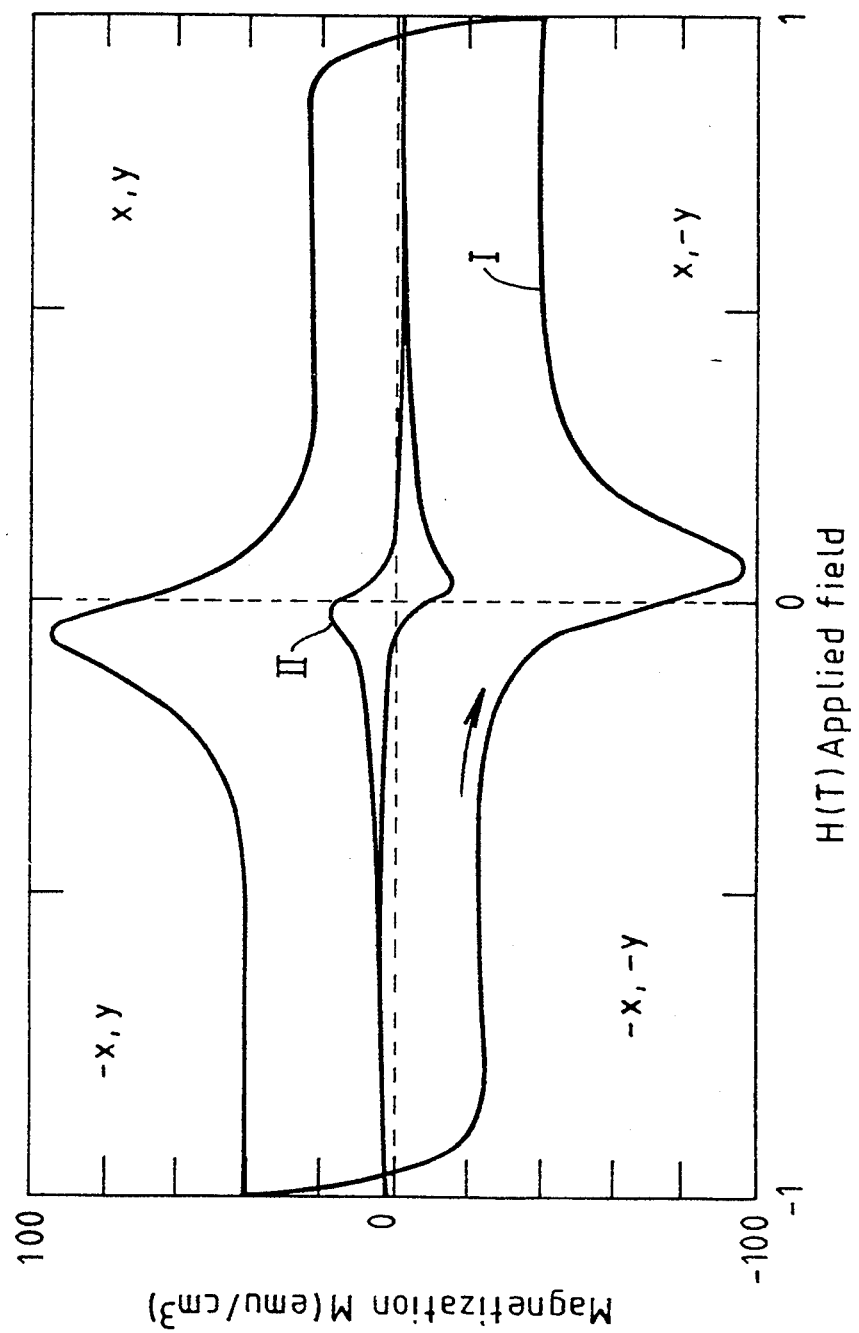
FIG. 9 is a graph of magnetic hysteresis loops of superconductive materials.

This is illustrated by FIG. 9, which shows a typical hysteresis loop I of a material of high magnetic hysteresis and a typical hysteresis loop II of a material of low magnetic hysteresis. It can be seen that on reversal of the direction of field change in the loop I (at 1 Tesla and at $-1$ Tesla in FIG. 9), the magnetization reverses rapidly, e.g. passes from the quadrant (x, -y) to the quadrant (x, y) in FIG. 9. Further, as shown in FIG. 9, the hysteresis loop I of a material of high magnetic hysteresis has a difference in magnetization $\Delta M$ of at least 10 emu/cm$^3$.

A levitation and running experiment described below was conducted with levitation bodies of materials with high magnetic susceptibility. The results showed that the levitation force is 10 to 100 times or more than with other materials. As a result, it is verified that a levitation body cooled with liquid nitrogen can be levitated and moved while levitated.

By using a material with a high magnetic hysteresis, a large scale levitation body with high levitation force can be easily made. For example, by embedding a plurality of high temperature superconductors in a metal matrix, a large scale levitation body can be easily formed.

By simply affixing high temperature superconductors onto a metal sheet, a large scale levitation body can be easily formed. By simply affixing high temperature superconductors onto a metal sheet, a large scale levitation body can be formed similarly. A metal box can be used as a mold for the matrix and hence a levitation body can be made easily.

On the surface of high temperature superconductors levitated above magnets, a shielding current flows so as to drive out the magnetic flux from the magnets. If this occurs, the shielding current flows through the high temperature superconductors, which are an aggregate of grains, as a whole and the high temperature superconductors act a diamagnetic material. The grain boundary is a relatively high resistance junction.

When a proceeding field or a variable field is applied, e.g. from driving coils, eddy currents flow due to electromotive force expressed by $E=d\Phi/dt$. Consequently, the high temperature superconductors can be made to a follow progressive field wave by sliding in the same way as a rotor of an inductive motor.

The electric resistivity of superconductors in the normal conductive state, which is measured in a magnetic field of, for example, 500 gauss, is about $10^{-3}$ ohm.cm. Therefore, when the electric resistivity of the non-magnetic metal mentioned above used to make a composite levitation body is for example less than $10^{-3}$ ohm.cm, the eddy current induced by the variable field increases and a large driving force is obtained compared with a case that a high temperature superconductor is used above as a levitation body.

A non-magnetic metal is used so as to avoid attraction between the material and the levitation magnets. This is the basis for the concept of the present invention of forming a composite body of superconductor elements and the non-magnetic electrically conductive material, to increase the drive force of the levitation body.

To keep a levitation body levitated, it is necessary to cool superconductors periodically or continuously, and it is impossible to keep superconductors, which are cooled once, in the superconductive state for a long time by their thermal capacity only. Therefore, by loading a cooling medium in the levitation body containing superconductors, continuous cooling is made possible.

An adiabatic material is suitably attached to the outside of the body, which for example is a metal box, so as to reduce evaporation of the cooling medium due to heat flow. The high temperature superconductors in the metal box or a metal block embedding them is directly cooled by heat transfer to the cooling medium. Direct cooling by the cooling medium is more effective.

By means of cooling medium feed stations installed along a track, the cooling medium can be fed into the metal box when necessary and the levitation body can be kept levitated continuously for many hours. The cooling medium feed can be simple by a flow of drops. The cooling medium can be transmitted and fed from another location.

Since the flux pinning force of high temperature superconductors with a high magnetic hysteresis is strong, the susceptibility reduces little when a magnetic field is applied, great levitation force is obtained, and the lateral guidance force during running can be increased.

The reason is that the track has in a uniform magnetic field in the running direction and the magnetic field does not change when the levitation body moves, but the field changes when displacement is generated in the lateral direction. Due to the flux pinning force, a force which is resistant to the lateral movement, e.g. a guidance force is generated.

To obtain the guidance force, it is necessary to pin the magnetic flux. There are two methods available. One method is that superconductors are cooled so as to enter the superconductive state and then a strong magnetic field is applied. For example, the superconductors are pressed against the levitation magnets after cooling so as to be exposed to a strong magnetic field at the magnet surface. The other method is that superconductors are cooled while a magnetic field is applied.

In a material with a high magnetic hysteresis, the pinning force is strong and hence the magnetic repulsion is also strong, that is, the levitation force is strong. Therefore, pressing the body against the magnetic surface requires strong force.

On the other hands, when the superconductors are cooled in the state that they are on the magnets, the flux pinning force when they enter the superconductive state is strong and they cannot levitate as they are. The concept of the present invention of providing separately coolable superconductor regions on the levitation body is therefore employed.

For example, the body is partitioned by adiabatic sheets at for example two locations extending parallel to the running direction. The central portions is first put into the superconductive state and levitated above the magnets. The lateral portions while in the normal conductive state are exposed to the magnetic flux from the magnets and then their superconductors are cooled.

Superconductors with strong pinning force may be used only in the portion or portions which are cooled after entry of the magnetic flux lines which will generate guidance force.

As mentioned above, since the track provides a uniform magnetic field in the running direction, the resistance which is applied to the levitation body during running is only air resistance. Therefore, even if the proceeding field of the driving coils is turned off, the levitation body can continue to run by inertia.

Even a stopped levitation body moves due to small disturbance or vibration. The levitation body moves by following the proceeding field by sliding. To stop the moving levitation body, it is not sufficient to turn the field off. By applying a proceeding field in the opposite direction of the running direction, driving force or braking force in the opposite direction of the running direction is obtained.

For the levitation body stopped at a predetermined location, by exciting the driving coils located under the front and back ends of the levitation body by a DC current so as to generate a field peak, a magnetic wall or braking force is applied to the levitation body to restrain it.

The number of driving coils increases according to scale-up of the running track, and simultaneous coil excitation of the entire track is wasteful. An increase in the number of coils leads to an increase in the total electric resistance. To let a predetermined current flow, a voltage source in proportion to the number of coils is required, and expensive apparatus for providing high voltage may be required.

By detecting the position of the levitation body and exciting only the driving coil or coils in the region where it is, the power of the device can be conserved. By using a plurality of power sources, a plurality of levitation bodies can run independently of each other.

Since the inertia running is possible as mentioned above, no driving coils are required in a section which requires no running control and the cost can be reduced. Since the size of driving coils is limited by the levitation gap between the levitation body and magnets, a large current can be obtained by decreasing the coil resistance by cooling the coils and the coils are prevented from overheating. As a result, higher field strength and power conservation can be obtained.

In a carrying path with a height difference having a sloping section, the driving force for the levitation body must be increased because the gravity acts when the levitation body goes up the slope. To achieve this, the magnetomotive force is increased by using coils whose ampere turns are more than that of coils used in the horizontal track section.

By installing a cooling medium pool in a lowered section of the track, the coils in the track sections near the pool are cooled and greater magnetomotive force or driving force can be obtained as mentioned above. Additionally, the levitated body may also be cooled.

Next, embodiments of the present invention illustrating these concepts will be given.

EMBODIMENT 1

The levitation running verification experiment is mentioned above was conducted with four types of high temperature superconductors, given in Table 1. Six levitation bodies were a disk 25 mm in diameter and 2 mm in thickness. Nos. 1 and 3 are levitation bodies with low magnetic hysteresis while Nos. 2 and 4 are levitation bodies with a high magnetic hysteresis manufactured by the melting method.

No. 5 is a body produced by a method tin which pellets produced by the sintering method used for No. 3 and pellets produced by the melting method used for No. 4 are crushed to pieces about 1 mm in diameter (average size), mixed at a ratio of 1 to 1, then mixed with Ag paste in an amount of 4 parts to 1 part of Ag paste and hardened by thermal treatment at 400° C. for one hour.

TABLE 1

| Experiment No. | Superconductor composition | Preparation method | Critical Temperature K. | Magnetization (max) emu/cm$^3$ | Levitation force g | Running Speed m/s | Levitation time s |
|---|---|---|---|---|---|---|---|
| 1 | YBa$_2$Cu$_3$O$_x$ | Sintering | 93 | 7 | 2 | 0.1 | 10 |
| 2 | YBa$_2$Cu$_3$O$_x$ | Melting | 90 | 60 | 120 | 1 | 10 |
| 3 | Tl$_2$Ba$_2$Ca$_2$Cu$_3$O$_x$ | Sintering | 122 | 5 | 10 | 0.5 | 60 |
| 4 | (Tl, Pb) (Ba, Sr)$_2$Ca$_2$Cu$_3$O$_x$ | Melting | 118 | 100 | 200 | 2 | 60 |
| 5 | Tl$_2$Ba$_2$Ca$_2$Cu$_3$O$_x$ and (Tl, Pb) (Ba, Sr)$_2$Ca$_2$Cu$_3$O$_x$ | Mixing with silver paste | 122 and 118 | 30 | 60 | 1 | 60 60 |

TABLE 1-continued

| Experiment No. | Superconductor composition | Preparation method | Critical Temperature K. | Magnetization (max) emu/cm$^3$ | Levitation force g | Running Speed m/s | Levitation time s |
| --- | --- | --- | --- | --- | --- | --- | --- |
| 6 | (Tl, Pb) (Ba, Sr)$_2$Ca$_2$Cu$_3$O$_x$ | Mixing with silver paste | 118 | 80 | 160 | 1.5 | |

No. 6 is a disk made in the same way as No. 5 using only pellets produced by the melting method of No. 4. The magnetization value given is a value in a magnetic field of 500 gauss at the temperature of liquid nitrogen.

In Table 1, critical temperatures and magnetization were measured using samples (Nos. 1-4) having a size of 2×15×1 mm, which were prepared by cutting the 25 mm×2 mm disk and samples (Nos. 1-6) having a size of 2×4×5 mm, respectively. The critical temperatures were measured by a four terminal method in which 10 mA was supplied. The magnetization was measured by placing the sample in such a manner that a magnetic field is parallel with the surface (4×5 mm).

The superconductor material used in the Example 1 exhibited the following critical current density.

|  | 0 gauss | 500 gauss |
| --- | --- | --- |
| Ex. No. 1 | 200 A/cm$^2$ | 20 A/cm$^2$ |
| Ex. No. 2 | 10000 A/cm$^2$ | 5000 A/cm$^2$ |
| Ex. No. 3 | 200 A/cm$^2$ | 20 A/cm$^2$ |
| Ex. No. 4 | 500 A/cm$^2$ | 50 A/cm$^2$ |
| Ex. No. 5 | 200-500 A/cm$^2$ | 20-50 A/cm$^2$ |
| Ex. No. 6 | 500 A/cm$^2$ | 50 A/cm$^2$ |

Each levitation body was levitated above a track 100 mm in width and 3 mm in length produced by Sm-Co permanent magnets and a driving magnetic field is generated by exciting driving coils installed on the track by a three phase alternating current. The surface field of the Sm-Co permanent magnet was 3000 gauss.

The levitation body was immersed and cooled in liquid nitrogen, picked up by tweezers, and placed on the track. The levitation force is measured by putting weight on the levitation body. The levitation force for Nos. 1 and 2 is 10 g or less, while the levitation force for materials with a high magnetic hysteresis is up to 20 times of this value.

The running speed and the levitation time (i.e. time before levitation ceased due to warm up) are all given in Table 1.

The levitation time for thallium based materials is longer than that for yttrium based materials. It depends on the temperature margin between 77K and critical temperature.

The levitation force and the running speed for materials with a higher magnetic hysteresis are higher.

It was also found that in the composite body of the present invention such as Nos. 5 and 6, the magnetic hysteresis value is obtained in accordance with the volume rate of each high temperature superconductor and Ag paste and particularly, by changing the mixing rate of two types of materials with different characteristics as No. 5, the magnetic hysteresis can be easily adjusted.

This demonstrates the advantages obtainable with the present invention of large levitation force and high running speed. Furthermore, in composite superconductors of the present invention, the magnitude of magnetic hysteresis can be optionally selected.

EMBODIMENT 2

With reference to FIG. 1, a levitation body 3 is formed by putting high temperature superconductor elements 1 of thallium containing oxide material of size 10 mm (width) by 20 mm (length) by 1.5 mm (thickness) made by sintering in an array of 6 by 5 by 2 into a copper box 2' of 70 mm (width) by 120 mm (length) by 100 mm (height) (inside dimensions) and pouring melted indium 2 into the metal box as a mold to form an indium matrix 5 mm high.

Liquid nitrogen 7 is poured into the metal box so as to cool the levitation body. The levitation body was levitated above a track of 100 mm (width) by 10 mm (height) produced by a Sm-Co permanent magnet 4. A driving coil 5 of 4 mm thickness installed on the track was excited by a three phase alternating current so as to generate a proceeding field, and the levitation body was driven.

In this embodiment, as mentioned above, a composite integrated levitation body is formed by joining small elements of sintered superconductors by a non-magnetic metal. The levitation gap of the levitation body, that is, the distance between the bottom of the levitation body and the driving coil was 8 mm. The driving force of the levitation body per volume which is obtained when the magnetomotive force of the coil is 200 ampere turns is $5 \times 10^{-2}$ N/cm$^3$, which is higher by two orders of magnitude than that when a similar levitation body is formed by high temperature superconductors.

EMBODIMENT 3

Figure 2:
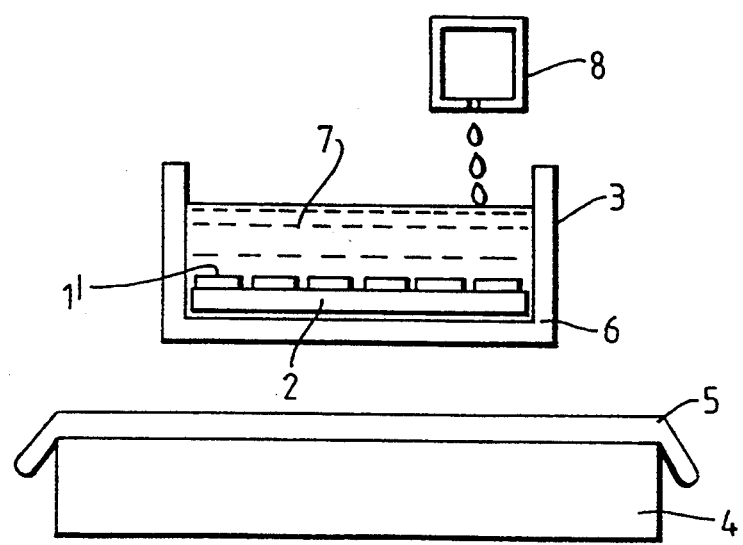
FIG. 2 is a transverse view showing construction of another levitation body employing the invention.

With reference to FIG. 2, high temperature superconductors 1' of yttrium containing oxide material of size 10 mm (width) by 20 mm (length) by 1.5 mm (thickness) produced by a melting method are affixed (laminated) onto an aluminum sheet 2' of size 65 mm (width) by 115 mm (length) by 2 mm (thickness) and mounted in a stainless steel vacuum chamber adiabatic box 6 to form a levitation body. The size of this box 6 is almost the same as that of the metal box of Embodiment 2.

The levitation body is put on the same track as that of Embodiment 2, the box 6 is filled with liquid nitrogen 7, and the levitation body is levitated. The levitation gap of the levitation body is 4 mm above the coils 5 and the driving force is almost the same as that of Embodiment 2.

In this embodiment, a liquid nitrogen transport pipe 8 is installed above the track, holes about 0.2 mm in diameter are bored in the pipe at a predetermined pitch, and liquid nitrogen is dropped naturally from the holes so as to be fed to continuously the running levitation body. By doing this, the levitation body can levitate and run continuously for many hours.

EMBODIMENT 4

Figure 3:
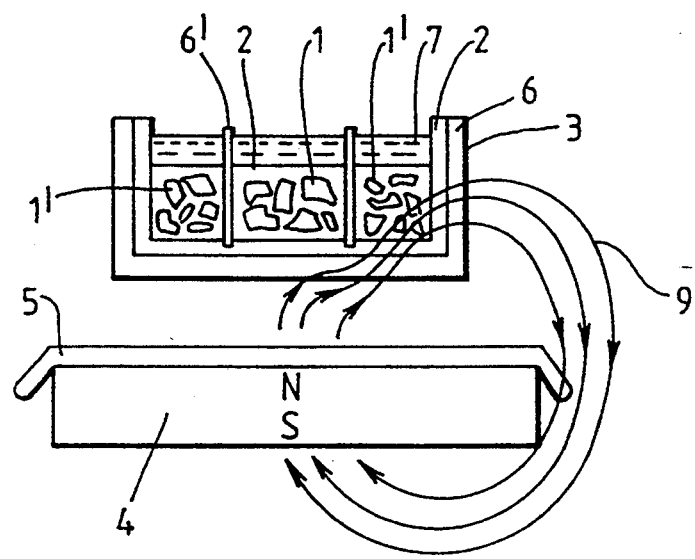
FIG. 3 is a transverse view of another levitation body of the present invention, showing the trapping of the magnetic flux.

Embodiment 4 will be explained with reference to FIGS. 3 and 4. An expanded polystyrene sheet 6 as an adiabatic material, is affixed to the outside of an aluminum box 2 with dimensions which are the same as those of Embodiment 2 and the metal box is partitioned into three spaces by adiabatic partition sheets 6′ comprising aluminum sheets laminated with expanded polystyrene sheets on both sides. The sheets 6′ are parallel with the running direction of the levitation body and are received at their lower ends in grooves in the floor and end walls of the box.

Cast indium matrices, having embedded in them bodies 1′ of high temperature superconductor oxide material containing yttrium which are produced by the melting method, are formed by casting in the outer two spaces and a cast indium matrix embedded with high temperature superconductors 1 of bismuth containing oxide material is formed in the central space.

The bismuth superconductors are sintered superconductors produced by the normal sintering method. The above superconductors of yttrium and bismuth are uneven in shape and generally each have smaller dimensions of at least 1 mm each.

The levitation body thus has two laterally outer compartments containing high temperature superconductors 1 of high magnetic hysteresis for flux pinning and a central compartment containing high temperature superconductors 1 of relatively low magnetic hysteresis.

As the operating procedure for this levitation body, the central space is filled with liquid nitrogen 7 first, the levitation body is levitated above the track, and then the outer spaces are cooled by liquid nitrogen. The driving coil is excited by a three phase alternating current so as to cause the levitation body to move. For the operation from deceleration to stop, the levitation body is sufficiently decelerated by mutually switching two phases of the three phase alternating current and then the excitation is turned off.

When the levitation body is stopped at a predetermined location, a magnetic field is applied by exciting the driving coils under the front and back ends of the levitation body by a direct current. The excitation direction at this time is set so that a magnetic field is generated in the direction which is the same as that of the bias field by the levitation magnets as shown in FIG. 4.

In this embodiment, by providing a time difference in cooling by means of the partitions 6′, the magnetic flux can be trapped in the levitation state. Furthermore, although the amount of high temperature superconductors of yttrium obtained by the melting method is reduced to ⅔ of that of Embodiment 2, the driving force obtained is almost the same as that of Embodiment 2, while high lateral guidance force is obtained due to the flux pinning illustrated in FIG. 3 in the lateral compartments.

Figure 4:
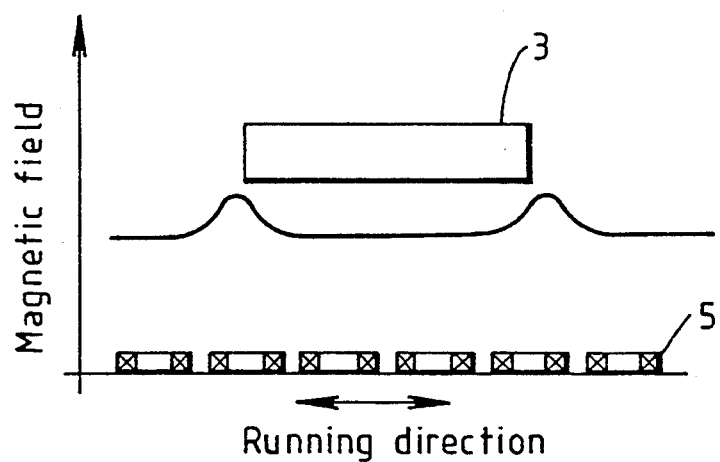
FIG. 4 is a diagram showing the magnetic field distribution for restraining a levitation body in an embodiment of the present invention.

Sufficient braking force can be obtained for deceleration and stopping by the field opposing motion and the levitation body can be securely held when stopped by the fields shown in FIG. 4.

EMBODIMENT 5

Figure 5:
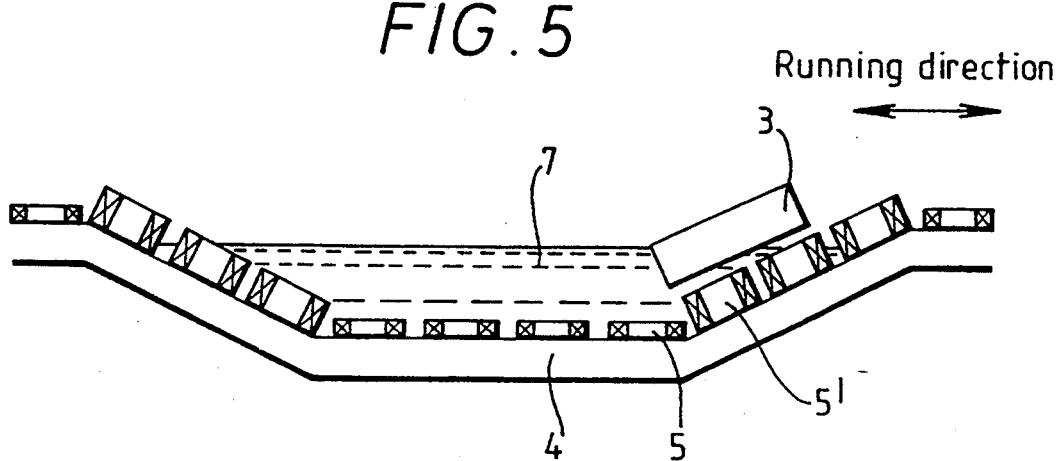
FIG. 5 is a sectional longitudinal view showing a portion of the track in a system embodying the present invention.

Embodiment 5 will be explained with reference to FIG. 5. A sloping track section at a slope of 10° is made using the levitation magnets used in Embodiment 2. A driving coil which is the same as that of Embodiment 2 is used in the horizontal track section and a driving coil 5′ 6 mm in thickness is used in the sloping track section. A levitation body cooling pool containing liquid nitrogen 7 is created at a lowered portion of the track.

Photosensors are installed at a plurality of locations of the track and the driving coils are connected to the power source via switching relays. No driving coils are installed at one part of the horizontal track section.

The levitation body used is the same as that of Embodiment 4. The cooling procedure is also the same as that of Embodiment 4. The running position of the levitation body is detected by the corresponding photosensor by means of non-contact, and only the driving coil or coils at the location of the levitation body are excited, in order to reduce power consumption. In the section where no coils are installed, the levitation body runs by inertia.

In this embodiment, when the levitation body passes the cooling pool, it is cooled by the liquid nitrogen. The value of ampere of turns of the coil 5′ in the sloping track section is larger than in the horizontal sections so as to generate great magnetomotive force.

Thus a driving force which is almost the same as that during horizontal running is obtained when going up the slope. The divided sections of the track are excited in accordance with running of the levitation body, and inertial running is performed when control is not required so as to reduce the power consumption of the device.

EMBODIMENT 6

Figure 6:
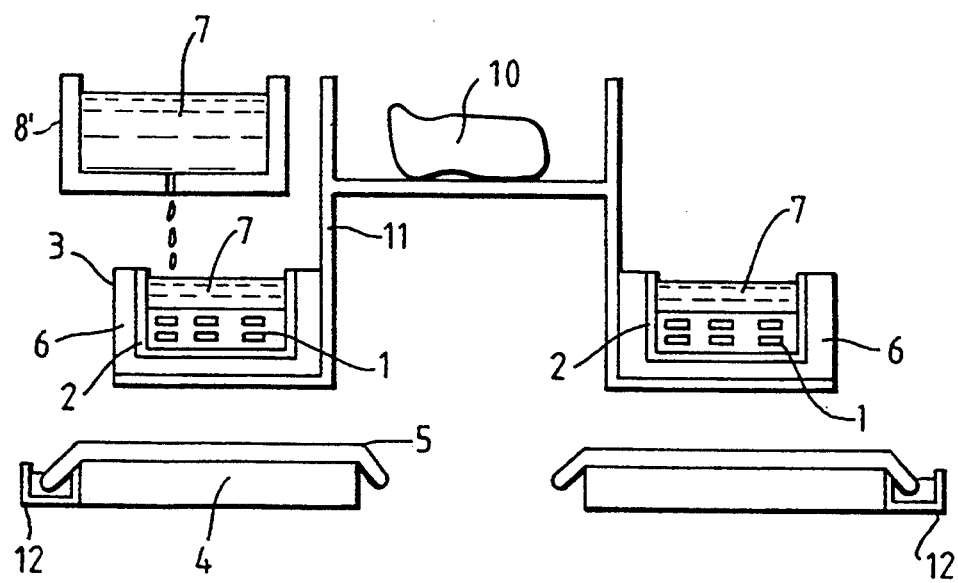
FIG. 6 is a transverse view showing using a further superconductor magnetic levitation device of the present invention, used for carrying an article.

Embodiment 6 will be explained with reference to FIG. 6. Two levitation bodies which are similar to that of FIG. 1 but have insulating sheets 6 are arranged side-by-side and connected to a supporting structure 11 so as to form a carrier for an article 10. This carrier has a carrying path which allows for linear levitation running between two points.

There is a space for loading articles to be carried provided at the center of the supporting bar or between the levitation bodies. For cooling, cooling stations 8′ for dropping liquid nitrogen 7 naturally are installed at several locations along the carrying path. A solenoid valve comprising an air core coil and a permanent magnet is incorporated in each cooling station so that the cooling station acts to drop liquid nitrogen only when the levitation body passes it (not shown in the drawing).

A liquid nitrogen collection duct which collects overflowing liquid nitrogen from the levitation body is installed beside the levitation magnet 4. One end of the driving coil 5 is located inside the collection duct.

By this embodiment, articles can be carried with non-contact with the ground. Since the driving coil is cooled by liquid nitrogen in the collection duct 12, the coil resistance is reduced and the coil can be excited at a low voltage compared with a case where no duct is used.

EMBODIMENT 7

Figure 7:
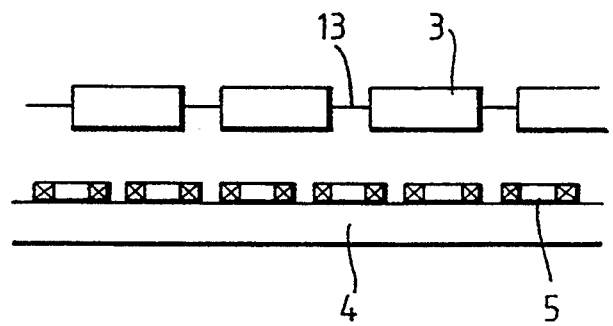
FIG. 7 is a sectional view of a part of a carrier system using the superconductor magnetic levitation principle of the present invention.

Embodiment 7 will be explained with reference to FIGS. 7 and 8. A plurality of levitation bodies which are the same as that used in Embodiment 4 are connected to each other by connecting bars 13 as shown in FIG. 7 into a continuous belt-like train.

Figure 8:
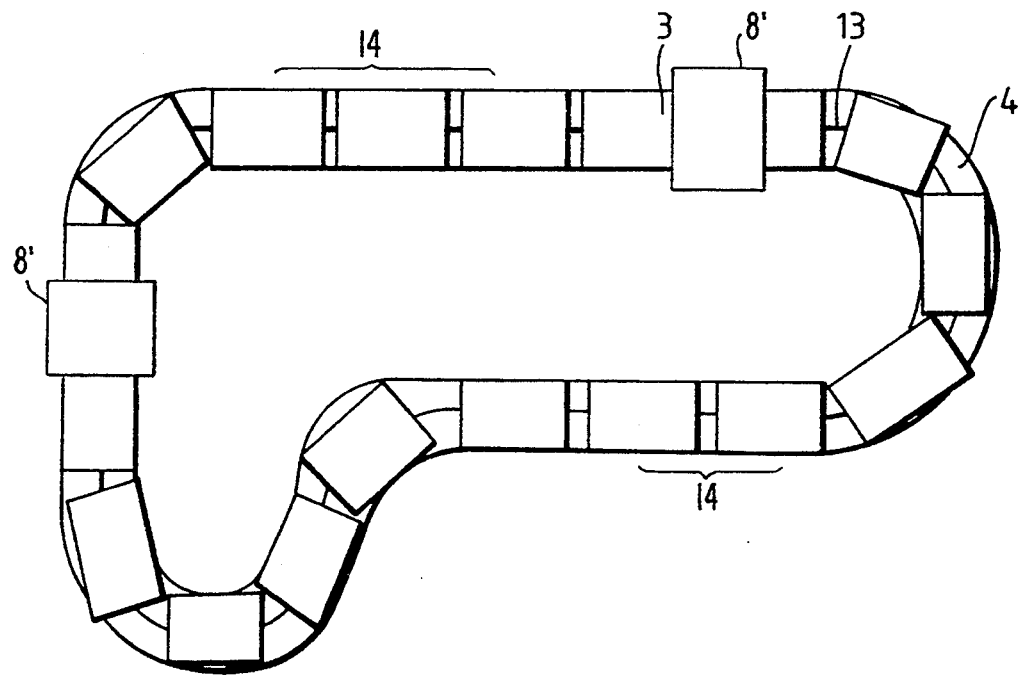
FIG. 8 is a plan view of the carrier system of FIG. 7.

The levitation magnets are the same as those used in Embodiments 2 to 4 and the track is structured as shown in FIG. 8. The connected levitation bodied are levitated along the track shown in FIG. 8 and driven by the driving coils. In this way a non-contact conveyor type carrier can be obtained.

We claim:
1. A magnetic levitation system having:

(a) a diamagnetic levitation body having superconductor elements of high temperature superconductive material,
(b) at least one levitation magnet providing a magnetic field effective for diamagnetic levitation of said levitation body, and
(c) at least one electromagnetic driving coil for applying a magnetic field effective to cause said levitation body to move when levitated by said levitation magnet, wherein said levitation body has an electrically conductive non-magnetic material uniting with said superconductive elements to form an integral composite body, and wherein at least a portion of said superconductor elements made of said high temperature superconductive material having high magnetic hysteresis so that at an applied magnetic field of ±.5T the magnetic hysteresis loop thereof has a difference in magnetization $\Delta M$ of at least 10 emu/cm$^3$.

2. A magnetic levitation system according to claim 1, wherein said levitation body has a shape such that at least two mutually perpendicular dimensions of it are both at least 10 mm.

3. A magnetic levitation system according to claim 1, wherein said levitation body has a plurality of said superconductive elements rigidly joined into said composite body by said non-magnetic material.

4. A magnetic levitation system according to claim 1, wherein the volume content of said superconductive material in said composite body is in the range of 10-99%.

5. A magnetic levitation system according to claim 1, wherein the volume content of said superconductive material in said composite body is at least 60%.

6. A magnetic levitation system according to claim 1, wherein said levitation body has a plurality of said superconductor elements which are embedded in and in a cast matrix of said non-magnetic material.

7. A magnetic levitation system according to claim 1, wherein having means for cooling said levitation body.

8. A magnetic levitation system according to claim 1, wherein said non-magnetic material comprises a box structure at least partly enclosing said superconductor elements.

9. A magnetic levitation system according to claim 1, wherein a thermal insulation material is attached to said box and said box has a space for receiving a cooling medium.

10. A magnetic levitation system according to claim 1, wherein said levitation body is mounted in a container.

11. A magnetic levitation system according to claim 1, wherein said container is thermally insulated and has a space for receiving a cooling medium.

12. A magnetic levitation system according to claim 1, having a plurality of cooling medium feed stations spaced apart along a path of movement of said levitation body for feeding a cooling medium to said levitation body.

13. A magnetic levitation system according to claim 1, having a plurality of said electromagnetic driving coils for applying magnetic fields to cause said levitation body to move along a track.

14. A magnetic levitation system according to claim 13, having means for providing a magnetic field to said levitation body when moving along said track, to decelerate or stop said levitation body.

15. A magnetic levitation system according to claim 13, having means for exciting said driving coils selectively in accordance with the location of said levitation body.

16. A magnetic levitation system according to claim 13, wherein at least one region of said track has no driving coils.

17. A magnetic levitation system according to claim 1, having means for cooling said driving coil.

18. A magnetic levitation system having:
(a) a diamagnetic levitation body having superconductor elements of high temperature superconductive material,
(b) at least one levitation magnet providing a magnetic field effective for diamagnetic levitation of said levitation body, and
(c) at least one electromagnetic driving coil for applying a magnetic field effective to cause said levitation body to move when levitated by said levitation magnet, wherein said levitation body has an electrically conductive non-magnetic material uniting with said superconductor elements to form an integral composite body, and said superconductor elements include first superconductor elements made of a first superconductive material, and second superconductor elements made of a second superconductive material different from said first superconductive material, said first superconductor elements being arranged in respective different regions of said composite body.

19. A magnetic levitation system having:
(a) a diamagnetic levitation body having superconductor elements of high temperature superconductive material,
(b) at least one levitation magnet providing a magnetic field effective for diamagnetic levitation of said levitation body,
(c) at least one electromagnetic driving coil for applying a magnetic field effective to cause said levitation body to move when levitated by said levitation magnet, wherein said levitation body has an electrically conductive non-magnetic material uniting with said superconductor elements to form an integral composite body, a plurality of said electromagnetic driving coils for applying magnetic fields to cause said levitation body to move along a track, and having means for applying DC current to a pair of said coils at which said levitation body is stopped so as to provide a magnetic field in the same direction as the field of said levitation magnet, thereby to restrain said levitation body against movement along said track.

20. A magnetic levitation system having:
(a) a diamagnetic levitation body;
(b) at least one levitation magnet providing a magnetic field effective for diamagnetic levitation of said levitation body, and
(c) at least one electromagnetic driving coil for applying a magnetic field effective to cause said levitation body to move when levitated by said levitation magnet, wherein said levitation body includes superconductive elements which are made of a high temperature superconductive material having high magnetic hysteresis so that at an applied magnetic field of ±.5T the magnetic hysteresis loop thereof has a difference in magnetization ΔM of at least 10 emu/cm³, whereby interaction of said superconductive material with said magnetic field provided by said levitation magnet produces lateral restraint of said levitation body when moving.

21. A magnetic levitation system according to claim 20, having means for cooling said levitation body.

22. A magnetic levitation system having:
(a) a diamagnetic levitation;
(b) at least one levitation magnet providing a magnetic field effective for diamagnetic levitation of said levitation body, and
(c) at least one electromagnetic driving coil for applying a magnetic field effective to cause said levitation body to move when levitated by said levitation magnet,
wherein said levitation body has first superconductor elements, second superconductor elements arranged laterally of aid first superconductor elements relative to a travel direction of said levitation body and means for thermally insulating said first superconductor elements and said second superconductor elements from each other, whereby said first superconductor elements and said second superconductor elements are independently coolable to superconductor temperature, at least one of said first and second superconductor elements being made of a high temperature superconductive material having high magnetic hysteresis so that at an applied magnetic field of ±.5T the magnetic hysteresis loop thereof has a difference in magnetization ΔM of at least 10 emu/cm³.

23. A magnetic levitation system according to claim 22, having at least two said second superconductor elements arranged on opposite lateral sides of said first superconductor elements.

24. A magnetic levitation system according to claim 22, wherein said first superconductor elements have a low magnetic hysteresis and said second superconductor elements have a high magnetic hysteresis.

* * * * *